United States Patent
Schwarz et al.

(10) Patent No.: US 11,320,911 B2
(45) Date of Patent: May 3, 2022

(54) HAND MOTION AND ORIENTATION-AWARE BUTTONS AND GRABBABLE OBJECTS IN MIXED REALITY

(71) Applicant: MICROSOFT TECHNOLOGY LICENSING, LLC, Redmond, WA (US)

(72) Inventors: Julia Schwarz, Redmond, WA (US); Jason Michael Ray, Seattle, WA (US); Casey Leon Meekhof, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 65 days.

(21) Appl. No.: 16/296,833

(22) Filed: Mar. 8, 2019

(65) Prior Publication Data
US 2020/0225757 A1 Jul. 16, 2020

Related U.S. Application Data

(60) Provisional application No. 62/791,226, filed on Jan. 11, 2019.

(51) Int. Cl.
*G06F 3/0482* (2013.01)
*G06F 3/01* (2006.01)
*G06T 19/00* (2011.01)

(52) U.S. Cl.
CPC .............. *G06F 3/017* (2013.01); *G06F 3/011* (2013.01); *G06F 3/0482* (2013.01); *G06T 19/006* (2013.01)

(58) Field of Classification Search
CPC ........ G06F 3/017; G06F 3/0482; G06F 3/011; G06T 19/006
See application file for complete search history.

(56) References Cited

U.S. PATENT DOCUMENTS

| | | | |
|---|---|---|---|
| 6,031,519 A | 2/2000 | O'Brien | |
| 6,222,465 B1* | 4/2001 | Kumar | G06F 3/017 341/20 |

(Continued)

OTHER PUBLICATIONS

"International Search Report and Written Opinion issued in PCT Application No. PCT/US19/067693", dated May 8, 2020, 12 Pages. (MS# 405733-WO-PCT).

(Continued)

*Primary Examiner* — Phenuel S Salomon
(74) *Attorney, Agent, or Firm* — Workman Nydegger

(57) ABSTRACT

Systems and methods are provided for detecting user-object interaction in mixed-reality environments. A mixed-reality system detects a controller gesture with an associated controller orientation in the mixed-reality environment. The mixed-reality system then determines an interaction region for the controller gesture and identifies one or more virtual objects within the interaction region. The virtual objects each have an associated orientation affinity. Subsequently, the mixed-reality system determines an orientation similarity score between the controller orientation and the orientation affinity for each virtual object within the interaction region. In response to determining that at least one orientation similarity score exceeds a predetermined threshold, the mixed-reality system executes an interaction between the controller and the virtual object that has the greatest orientation similarity score.

22 Claims, 12 Drawing Sheets

(56) References Cited

U.S. PATENT DOCUMENTS

| | | | | |
|---|---|---|---|---|
| 6,426,745 | B1* | 7/2002 | Isaacs | G06F 3/04845 345/419 |
| 7,058,896 | B2* | 6/2006 | Hughes | G06F 3/04815 345/419 |
| 7,535,456 | B2 | 5/2009 | Liberty et al. | |
| 7,676,356 | B2* | 3/2010 | Carmel | G06T 19/00 703/21 |
| 7,976,385 | B2 | 7/2011 | Riggs et al. | |
| 2002/0033845 | A1* | 3/2002 | Elber | G06T 17/00 715/764 |
| 2004/0193413 | A1* | 9/2004 | Wilson | H04N 13/128 704/243 |
| 2008/0024435 | A1 | 1/2008 | Dohta | |
| 2008/0062126 | A1* | 3/2008 | Algreatly | G06F 3/02 345/157 |
| 2008/0231926 | A1* | 9/2008 | Klug | H04N 13/327 359/23 |
| 2009/0228841 | A1* | 9/2009 | Hildreth | G06F 3/0304 715/863 |
| 2010/0279773 | A1 | 11/2010 | Atzmon | |
| 2010/0302161 | A1 | 12/2010 | Ng | |
| 2011/0066984 | A1* | 3/2011 | Li | G06K 9/3208 715/863 |
| 2011/0149042 | A1* | 6/2011 | Lee | H04N 13/156 348/46 |
| 2012/0113223 | A1* | 5/2012 | Hilliges | G06F 3/011 348/46 |
| 2013/0104084 | A1* | 4/2013 | Mlyniec | G06F 3/0346 715/849 |
| 2013/0342572 | A1* | 12/2013 | Poulos | G06F 3/012 345/633 |
| 2014/0015831 | A1* | 1/2014 | Kim | G06F 3/0346 345/419 |
| 2014/0204002 | A1* | 7/2014 | Bennet | G06F 3/04815 345/8 |
| 2014/0282008 | A1* | 9/2014 | Verard | G03H 1/00 715/728 |
| 2015/0199850 | A1* | 7/2015 | Uematsu | G02B 27/017 345/633 |
| 2017/0060230 | A1* | 3/2017 | Faaborg | G06T 19/006 |
| 2017/0109936 | A1* | 4/2017 | Powderly | G06F 3/0482 |
| 2017/0278304 | A1* | 9/2017 | Hildreth | G06F 3/011 |
| 2017/0329488 | A1* | 11/2017 | Welker | G06F 3/04845 |
| 2018/0012407 | A1* | 1/2018 | Chuang | G06T 7/75 |
| 2018/0040044 | A1* | 2/2018 | Mattingly | G06Q 30/0643 |
| 2018/0096507 | A1* | 4/2018 | Valdivia | G06F 3/011 |
| 2019/0034076 | A1* | 1/2019 | Vinayak | G06T 19/006 |
| 2019/0102927 | A1* | 4/2019 | Yokokawa | G06T 13/40 |
| 2019/0371071 | A1* | 12/2019 | Lyons | G06T 19/006 |
| 2020/0225757 | A1* | 7/2020 | Schwarz | G06T 19/006 |

OTHER PUBLICATIONS

"How to prevent accidental button press?", Retrieved From: https://ux.stackexchange.com/questions/110083/how-to-prevent-accidental-button-press, Retrieved Date: Dec. 26, 2018, 10 Pages.

Epstein, et al., "Motion Sensing with Accelerometers—Present and Future", In American Society for Engineering Education Conference, 2006, 5 Pages.

Nanjappan, et al., "User-elicited dual-hand interactions for manipulating 3D objects in virtual reality environments", In Journal of Human-centric Computing and Information Sciences, Dec. 1, 2018, 16 Pages.

* cited by examiner

HAND MOTION AND ORIENTATION-AWARE BUTTONS AND GRABBABLE OBJECTS IN MIXED REALITY

CROSS-REFERENCE TO RELATED APPLICATIONS

This application claims the benefit of and priority to U.S. Provisional Patent Application Ser. No. 62/791,226, filed on Jan. 11, 2019 and entitled "HAND MOTION AND ORIENTATION-AWARE BUTTONS AND GRABBABLE OBJECTS IN MIXED-REALITY," which application is expressly incorporated herein by reference in its entirety.

BACKGROUND

"Augmented reality" typically refers to virtual experiences where virtual objects are visually placed within the real world, such that a user experiences virtual content and the real world simultaneously. In contrast, "virtual reality" typically refers to immersive virtual experiences where a user's view of the real-world is completely obscured and only virtual objects are perceived. Typically, "mixed-reality" refers to either augmented reality or virtual reality environments. However, for the sake of clarity and simplicity, the terms mixed-reality, virtual reality, and augmented reality are used interchangeably herein.

Mixed-reality systems are typically configured as head mounted displays that generate and/or render the mixed-reality content. Continued advances in hardware capabilities and rendering technologies have greatly increased the realism of virtual objects and scenes displayed to a user within mixed-reality environments. For example, virtual objects can be placed within a mixed-reality environment in such a way as to give the impression that the virtual object is part of the real world.

Some mixed-reality systems have been configured to track the movement of a user's body parts, such as the user's hands, as the user interacts with virtual objects in the mixed-reality environment. Furthermore, some mixed-reality systems are configured to replicate the user's body parts within the mixed-reality, such that the user is able to view and control virtualized body parts within the mixed-reality environment. For instance, a user's hand can be presented as a hologram occlusion that moves within the mixed-reality environment in direct response to the movements of their own real-world hand. As the user moves their real-world hand, the hand occlusion is also moved, such that it is capable of interacting with other virtual objects within the mixed-reality environment.

Many mixed-reality systems allow users to use their body parts (or tools or other controllers manipulated thereby) to interact with virtual objects in the mixed-reality environment. For instance, some mixed-reality systems allow a user to use their hands (or virtual representations thereof) to grab, push, pull, pick up, slide, press, rotate, or otherwise interact with virtual objects or virtual input elements (such as virtual buttons) within the mixed-reality environment.

Several obstacles exist, however, in facilitating user interaction with such virtual objects or virtual input elements in mixed-reality environments. For instance, physical objects have physical geometries which constrain the way in which the object can be interacted with (e.g., where a physical button cannot be pushed from the back, and where a physical cube cannot be picked up with the back of a user's hand). In contrast, virtual objects do not have such physical constraints, which often gives rise to accidental or unintentional interaction between users and such virtual objects within the mixed-reality environments. For example, a user may unintentionally press a virtual button when the user's hand or controller passes through the virtual button from the back side of the button. Similarly, a user may unintentionally grab or interact with an object when passing their hands through the object in a relaxed position.

Accordingly, there is an ongoing need in the field of mixed-reality for providing improved user interaction with virtual objects or virtual input elements.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include methods and systems for detecting and responding to user-object interactions in mixed-reality environments.

In some embodiments, a mixed-reality system detects a controller gesture with an associated controller orientation in a mixed-reality environment. The mixed-reality system then determines an interaction region for the controller gesture and identifies one or more virtual objects within the interaction region. The virtual objects each have an associated orientation affinity. Subsequently, the mixed-reality system determines an orientation similarity score between the controller orientation and the orientation affinity for each virtual object within the interaction region. Then, in response to determining that at least one orientation similarity score exceeds a predetermined threshold, the mixed-reality system executes an interaction between the controller and the virtual object that has the greatest orientation similarity score.

In some embodiments, a mixed-reality system identifies a mixed-reality input element (e.g., a selectable button or interface element for an application) that is selectively triggered for providing or processing user input associated with the input element (e.g., selection of the input element for causing a corresponding application to execute a function associated with input accepted/received at the input element). The mixed-reality input element has an associated directional preference for receiving interaction of a user controller (e.g., gesture input) for selectively triggering the input when the corresponding gesture input is received and accepted.

The mixed-reality system also detects a gesture input associated with the user controller (e.g., a user finger) and determines a directional component of the controller gesture as the user controller interacts with the mixed-reality input element by providing the gesture input (e.g., causing the controller to intersect a display surface of the input element). Subsequently, in response to determining that the directional component of the controller gesture matches the directional preference of the mixed-reality input element, within a predefined threshold, the mixed-reality system selectively accepts, triggers and/or processes the gesture input associated with the mixed-reality input element which is sufficient for causing the corresponding application to execute the function associated with the input. Alternatively, if is determined that the directional component of the controller gesture fails to match the directional preference of the mixed-reality input element, within the predefined threshold, the mixed-reality system selectively ignores and fails to accept, trigger and/or process the gesture input.

Alternatively, or additionally, other combinations of computer properties can also be used to determine when input is received and accepted or ignored for enabling or refraining from enabling functionality of an input element. For instance, mappings between input element affinities and controller/gesture properties can be used to selectively enable or disable input modes of input elements for receiving and processing input directed at the input elements from controllers, based on the particular controller/gesture properties.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
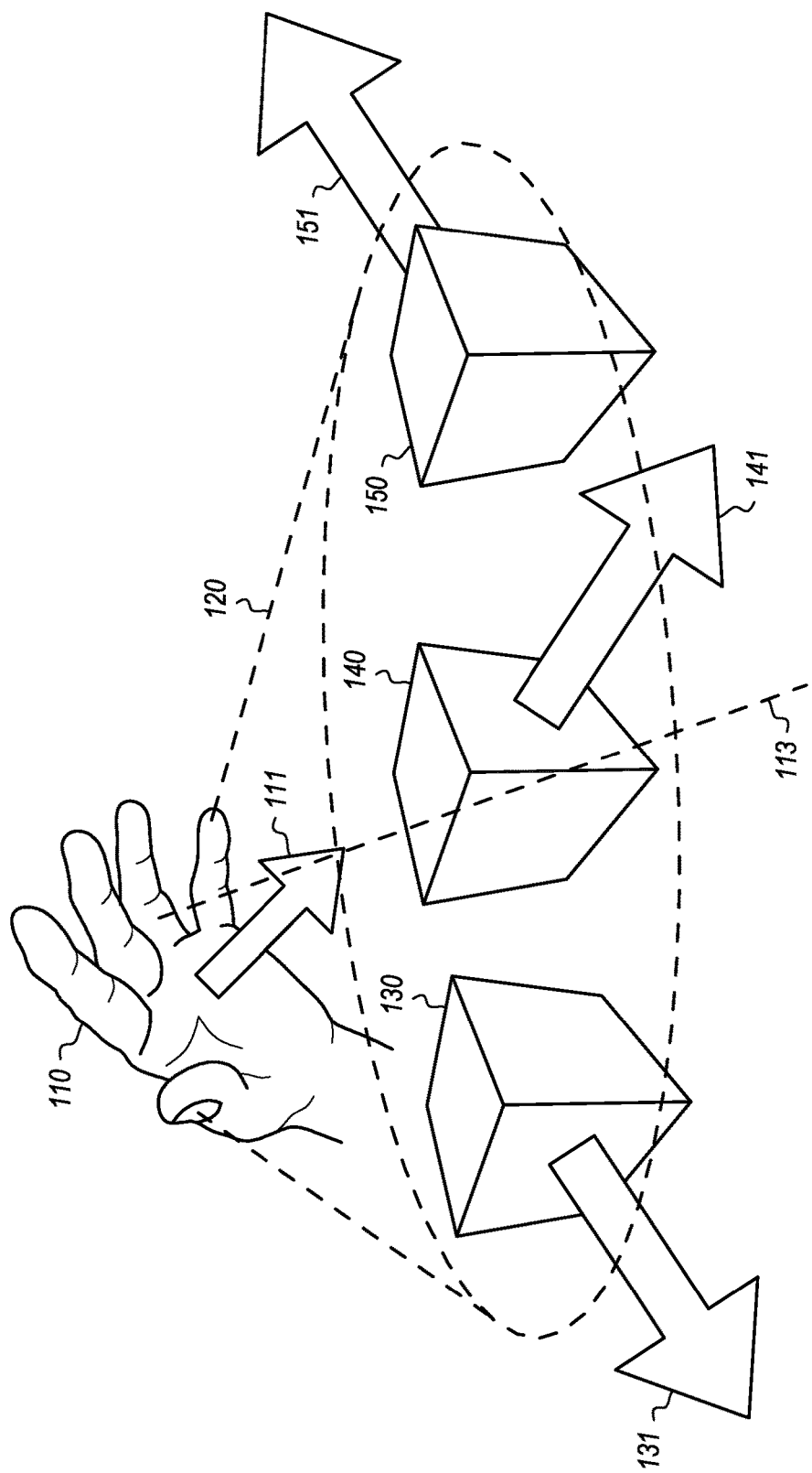
FIG. 1 illustrates a mixed-reality environment that includes a user hand and a plurality of virtual objects.

Some disclosed embodiments include systems and methods configured to detect and facilitate user-object interactions in mixed-reality environments.

Many mixed-reality systems allow users to interact with virtual objects in mixed-reality environments using controllers, which may include a user's own body parts (such as their fingers, hands, arms, feet, legs or other body parts) or virtual representations thereof. User interactions with virtual objects may include, for instance, grabbing, pushing, pulling, picking up, sliding, pressing, rotating, or acting upon virtual objects or virtual input elements (such as virtual buttons) within the mixed-reality environment.

To ameliorate accidental interaction between users and virtual objects or input elements, one possible solution is to have added requirements for enabling users to interact with virtual objects. For example, a system might require a user's hand to be in a particular pose (e.g., in an open position) before allowing interaction with certain virtual objects. In another possible solution, a mixed-reality system might require that a user's hand be in a specific pose for a duration of time before executing an interaction with certain virtual objects.

These solutions, however, may fall short in a number of circumstances. For instance, where several interactable virtual objects and/or virtual input receivers are in close proximity to one another, many mixed-reality systems would have difficulty identifying which particular virtual object or input receiver the user intends to interact with. In such instances, user gestures towards clusters of virtual objects/input receivers may result in unintended user interaction with the virtual content.

Additionally, some virtual objects, such as control buttons may process user input that is unintended, such as when a user traverses a plane associated with the control button in a wrong direction (i.e., a direction other than a direction associated with depressing the virtual button). In particular, while physical objects have physical geometries, which constrain the way in which the objects can be interacted with, virtual objects do not have such physical constraints. This lack of physical constraints often gives rise to accidental or unintentional interaction between users and virtual objects. By way of example, a user may pass their hand through a virtual button from the back side of the virtual button and unintentionally trigger the button input. Similarly, a user may unintentionally grab or interact with an object when passing their hands through or past the object in a relaxed position.

To help ameliorate some of these problems, various solutions are provided in this disclosure to facilitate interactions between user's and virtual objects in a way that is intuitive and predictable, and which can greatly enhance a user's mixed-reality experience.

In some embodiments, a mixed-reality system detects a controller orientation of a controller gesture, determines an interaction region and identifies one or more virtual objects therein, determines an orientation affinity for each virtual object(s) and an orientation similarity score between the controller orientation and the one or more orientation affinities, and executes an interaction between the controller and the virtual object with the highest orientation similarity score (in response to determining that an orientation similarity score exceeds a threshold).

In some embodiments, a mixed-reality system identifies a mixed-reality input element and a directional preference therefor, detects a controller gesture and directional component thereof, and, in response to determining that the directional component and the directional preference match, selectively triggers an input associated with the mixed-reality input element.

Those skilled in the art will recognize that the embodiments disclosed herein may provide significant benefits over conventional systems and methods for detecting user-object interaction in mixed-reality environments. For example, some disclosed embodiments avoid unintended user interaction with virtual objects, particularly when an orientation of a user controller does not correspond to an orientation affinity of a virtual object, or when a directional component of a user's gesture does not comply with a directional preference of a virtual object. In some instances, this functionality proves particularly beneficial in circumstances where a user makes a gesture to interact with a virtual object that is in close proximity to other virtual objects. Therefore, some embodiments disclosed herein provide for a seamless interaction pattern between users and virtual objects and/or virtual input elements, thus improving the user experience.

Having just described some of the various high-level features and benefits of the disclosed embodiments, attention will now be directed to FIGS. 1 through 11. These figures illustrate various functionalities, examples, supporting illustrations, and methods related to detecting and facilitating/controlling user-object interactions in mixed-reality environments. Subsequently, attention will be directed to FIG. 12, which presents an example computer system that may be used to facilitate the disclosed principles.

The following embodiments are discussed in the context of a mixed-reality system (e.g., computer system 1200 illustrated in FIG. 12) where a mixed-reality environment including one or more holograms is presented to a user at a mixed-reality display device and where the user may interact with one or more objects. A user-operated control (e.g., a user's hand) for interacting with the mixed-reality environment may be tracked by the mixed-reality system (see FIG. 12 and the relevant discussion of sensors 1220 and 1230), such that the mixed-reality system detects movement, pose, and other characteristics of the user control. In response to detecting certain movement, poses, and/or other variables/values based on such movement and/or poses of the user control, the mixed-reality system may execute certain commands and/or input to facilitate user-object interactions and to thereby help to control user experiences in mixed-reality environments.

Attention is now directed to FIG. 1, which illustrates an embodiment wherein a mixed-reality system detects user-object interaction in a mixed-reality environment. FIG. 1 shows a user controller embodied as a user's hand 110 as it performs a gesture in the mixed-reality environment. Here, the gesture corresponds to a grab motion, which the mixed-reality system detects as input for initiating an interaction with a virtual object in the mixed-reality environment.

When the mixed-reality system detects the user's gesture, the mixed-reality system determines an interaction region 120 for the user's gesture. The interaction region 120 defines which objects the user's gesture is directed toward, thus defining a set of virtual objects that the user may be attempting to interact with (e.g., virtual objects 130, 140, and 150). As illustrated in FIG. 1, a dashed conical region extends from the user's hand 110 as the user performs the grab gesture, which corresponds to the interaction region 120 for the user's gesture.

Upon determining the interaction region 120, the mixed-reality system then identifies one or more virtual objects (e.g., virtual objects 130, 140, 150) within the interaction region 120.

As shown in FIG. 1, virtual objects 130, 140, and 150 all lie within the interaction region 120 and are thus candidates for becoming the subject of the interaction triggered by the user's gesture.

Although the grab region 120 is depicted in FIG. 1 as an oblique conical region extending away from the controller (e.g., hand 110), along an axis of directionality 113 corresponding to the controller orientation and/or direction of movement, those skilled in the art will recognize that the grab region 120 may be implemented as a region of any shape, such as a spherical, cylindrical, pyramidal, or prismatic region. Furthermore, it will be appreciated that, in some embodiments, the mixed-reality system identifies the interaction region based on the pose or other characteristics of the user's hand or controller while making the controller gesture. For example, the interaction region may be defined as a spherical region when the user makes a gesture with their hand in a pose that corresponds to gripping a physical ball. In another example, the interaction region may be defined as a triangular prismatic region when the user makes a gesture with their hand in a pose that corresponds to a pinch with their index finger and thumb.

In yet other embodiments, the interaction region is defined dynamically based on characteristics of user controller gesture that initiates the interaction sequence, such as the velocity of the user's controller that performs the controller gesture. By way of example, when a user's hand makes an interaction or grab pose while the hand is moving, the size of the interaction region is augmented in the direction of the hand movement.

In some embodiments, the interaction region extends a predetermined distance from the user's hand/controller, such as a few inches to a few feet. The predetermined distance may also be a variable distance that varies according to the gesture of the controller. For example, in some instances, as the user's fingers expand, the interaction region dynamically expands in width as well as depth. In other embodiments, the depth is a fixed distance and the width is the only dimension that expands with the figures.

In some instance, the interaction region is visually presented to the user upon detecting a selection gesture or context associated within a mixed-reality environment. The visual presentation can be a hologram having a predefined level of transparency. IN other embodiments, the visual presentation of the interaction region is a hologram that reflects an outline of the interaction region boundaries.

Figure 2A:
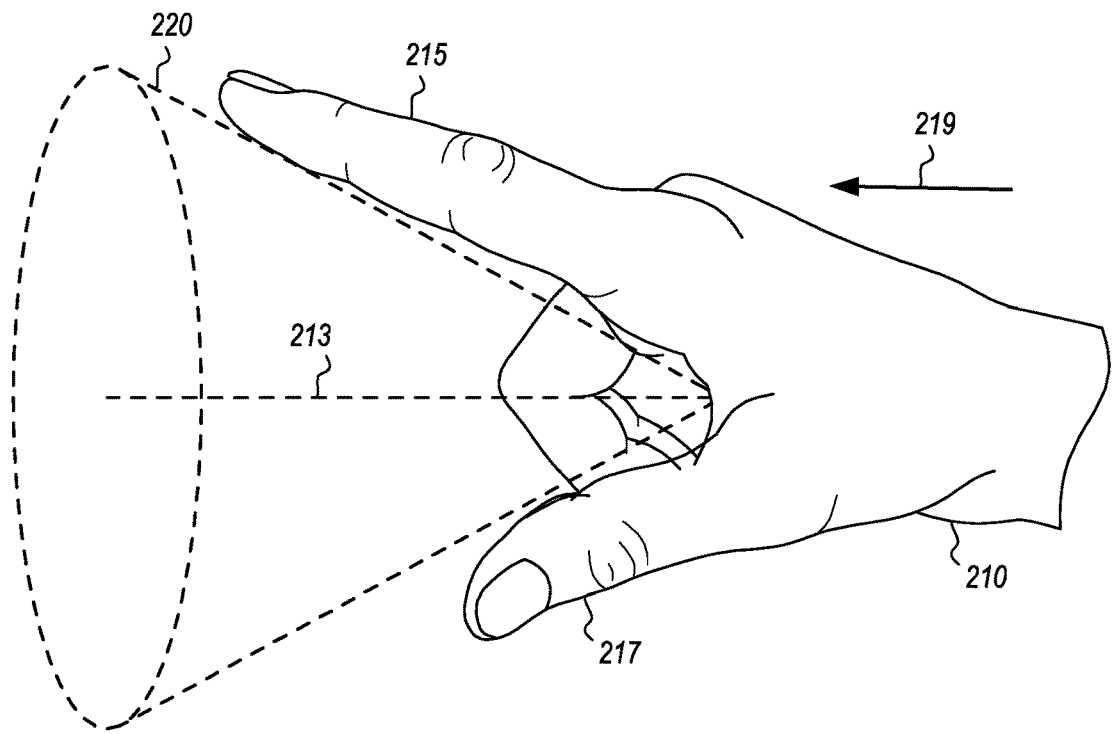
FIGS. 2A and 2B illustrate embodiments in which interaction regions extend away from a user-operated controller comprising a user's hand.
Figure 2B:
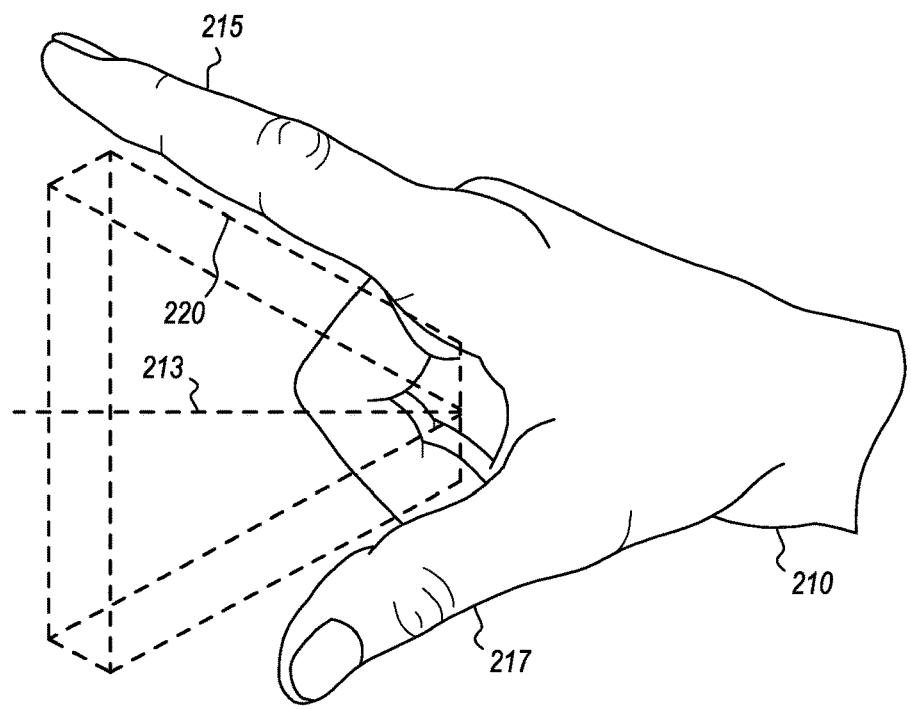

To provide an illustrative example of these principles, FIGS. 2A and 2B show a user's hand 210 in a pose that corresponds to a pinch gesture with their index finger 215 and thumb 217, and an interaction region 220 (conical region in FIG. 2A and triangular prismatic region in FIG. 2B) is shown extending from the user's hand 210 along an axis of directionality 213 of the user's hand 210. In some implementations, the shape, size, and/or orientation of the interaction region 220 is determined based on the detected pose or other characteristic of the user controller (e.g., hand 210). For example, the orientation of the interaction region 220 shown in FIGS. 2A and 2B corresponds to the detected axis of directionality 213 of the user's hand 210 (i.e., the interaction region 220 extends in the direction of the axis of directionality 213 of the user's hand 210). In some embodiments, the axis of directionality 213 is based on the pose of the user's hand 210 or a motion characteristic of the user's hand 210 (e.g., velocity, as described below).

Additionally, in some embodiments, the mixed-reality system is configured to select a particular shape (e.g., a spherical, cylindrical, pyramidal, or prismatic shape) for the interaction region 220 based on the angular relationship between the fingers or other individual members of the user-operated hand 210 or other controller (e.g., an angular relationship between the user's thumb 217, index finger 215, and/or the other fingers).

Furthermore, in some implementations, the size of the interaction region is based on a motion characteristic (e.g., velocity or acceleration) of the user-operated controller (e.g., hand 210). For example, the user's hand 210 shown in FIG. 2A has a velocity associated therewith (denoted by arrow 219), and the size of the interaction region 220 is increased based on the detected velocity of the user's hand 210. Still furthermore, in some embodiments, the size of the interaction region 220 is based on other characteristics of the user-operated controller. By way of example, as shown in FIGS. 2A and 2B, the size of the interaction region 220 is based on the angular relationship between the user's index finger 215 and thumb 217.

In still other embodiments, the interaction region 220 is defined by other environmental contexts and/or user activity context factors. In one example, when a user is immersed in a role-playing application and becomes inflicted with an impaired state, the interaction/grab region 220 may be reduced in size or have an irregularity introduced thereto. In yet another example, when a user immersed in an application with a control or building mode, the interaction region 220 may be generally augmented in size to facilitate easier manipulation of the user's environment.

Continuing with FIG. 1, the user's hand 110 has an arrow extending from the palm of the hand 110 in a direction substantially normal to the surface of the palm. The arrow indicates a controller orientation 111. Although the controller orientation 111 is illustrated as extending from the palm of the user's hand 110, it should be noted that the controller orientation 111 may be based on other parts of the controller and/or be based on a pose of the controller. For example, the controller orientation 111 may be based on an orientation of a user's index finger when the user's hand is in a pose with the only the index finger extended. In another example, when the controller is embodied as a user-held wand, the controller orientation may extend away from an end of the wand based on the pose of the wand. Furthermore, as with the interaction region, the controller orientation 111 of a controller may be determined dynamically (e.g., based on motion or other characteristics of the user's hand or other controller), and in some embodiments, the controller orientation 111 points in the same direction as the axis of directionality 113.

Similarly, the virtual objects within the interaction region (virtual objects 130, 140, and 150) each have a corresponding arrow which indicates an orientation affinity for each object (orientation affinities 131, 141, and 151, respectively). The orientation affinity for an object, in some implementations, defines an orientation parameter that a user's controller must conform to in order to interact with the object (as discussed in further detail below). As shown, the orientation affinity for each of the virtual objects 130, 140, and 150 points in a different direction. Illustratively, in layman's terms, each of the virtual objects 130, 140, and 150 "prefer" to be interacted with from different directions.

In some instances, a virtual object has more than one orientation affinity, and the mixed-reality system selects the orientation affinity to be used in carrying out the interaction determination sequence based on the pose or other characteristics of the user controller that performs the user gesture. For example, a virtual object 140 may be configured to be interacted with in a variety of ways (e.g., by lifting up, pushing, pulling, etc.) and so may include a variety of orientation affinities (in addition to orientation affinity 141). The mixed reality system selects the appropriate orientation affinity for carrying out the interaction determination sequence based on the pose of the user controller (e.g., whether the user's hand position corresponds to a lifting, pushing, or pulling position) or another characteristic of the user controller (e.g., a motion characteristic, which may trigger the orientation affinity associated with pushing the object, regardless of the controller orientation 111 of the user controller/hand 110).

Upon determining the controller orientation 111 and the orientation affinity (e.g., 131, 141, and 151) for each virtual object (e.g., 130, 140, and 150) within the interaction region 120 for the controller gesture, the mixed-reality system determines an orientation similarity score between the controller orientation and the orientation affinity for each of the virtual objects within the interaction region 120. The mixed-reality system performs this step to identify and/or rank the virtual objects in the interaction region (e.g., candidate objects) in order of the directional similarity they share with the controller orientation 111 of the user's gesture. In some embodiments, the virtual object(s) with the highest orientation similarity score will be the most logical/selected choice as the subject object(s) of the interaction triggered by the user's gesture within the interaction region 120.

The orientation similarity scores between the controller orientation 111 and each of the orientation affinities of the virtual objects (e.g., orientation affinities 131, 141, and 151 of virtual objects 130, 140, and 150, respectively) may be determined in a variety of ways. In some embodiments, the mixed-reality system determines a dot product between the controller orientation 111 and each orientation affinity separately and utilizes the dot product values as the orientation similarity scores. In some embodiments, the mixed-reality system utilizes a different method to formulate orientation similarity scores between the controller orientation 111 and the various orientation affinities, such as cosine similarity or normalized measures of Euclidean distance, Manhattan distance, or Minkowski distance.

After determining the orientation similarity scores, in some embodiments, the mixed-reality system determines whether any of the orientation similarity scores exceed a predetermined threshold. In some instances, requiring a threshold to be met before executing an interaction prevents undesired user-object interactions in mixed-reality environments, in particular where the highest orientation similarity score only indicates low similarity between the controller orientation 111 and the orientation affinity.

In some embodiments, in response to determining that at least one orientation similarity score exceeds the predetermined orientation similarity threshold, the mixed-reality system executes an interaction between the controller (e.g., hand 110) and the particular virtual object (e.g., 130, 140, or 150) within the interaction region 120 that has the greatest or maximum orientation similarity score. Accordingly, the mixed-reality system, in some implementations, selects the virtual object(s) that most likely corresponds to the user's intended object for interaction. This may include selecting only a single virtual object or a plurality of virtual objects that are associated with orientation similarity scores that exceed a predetermined threshold and/or that are within a predetermined variance/deviation from an object associated with a highest orientation similarity score.

In reference to FIG. 1, the controller orientation 111 for the user's hand 110 and the orientation affinities 131, 141, 151 for virtual objects 130, 140, 150, respectively, within the interaction region 120 are shown. Because the controller orientation 111 and the orientation affinity 141 of virtual object 140 point in substantially the same direction (or, at least, orientation affinity 141 is more aligned with controller orientation 111 than orientation affinities 131 and 151), the orientation similarity score between the controller orientation 111 and the orientation affinity 141 will be higher than the orientation similarity scores calculated for orientation affinities 131 and 151. As such, upon determining that the orientation similarity score between the controller orientation 111 and orientation affinity 141 exceeds a predetermined threshold, the mixed-reality system executes an interaction between the user's hand virtual object 140 (e.g., the user picks up virtual object 140 instead of virtual object 130 or virtual object 150).

Although the discussion of FIG. 1 has focused on a grab gesture performed by a user's hand, those skilled in the art will recognize that other controllers (such as handheld controllers) and/or other gestures/poses are within the scope of this disclosure. For example, the gesture for initiating a user-object interaction could amount to a push, slide, pull, press, or rotation gesture, or any combination thereof.

Figure 3:
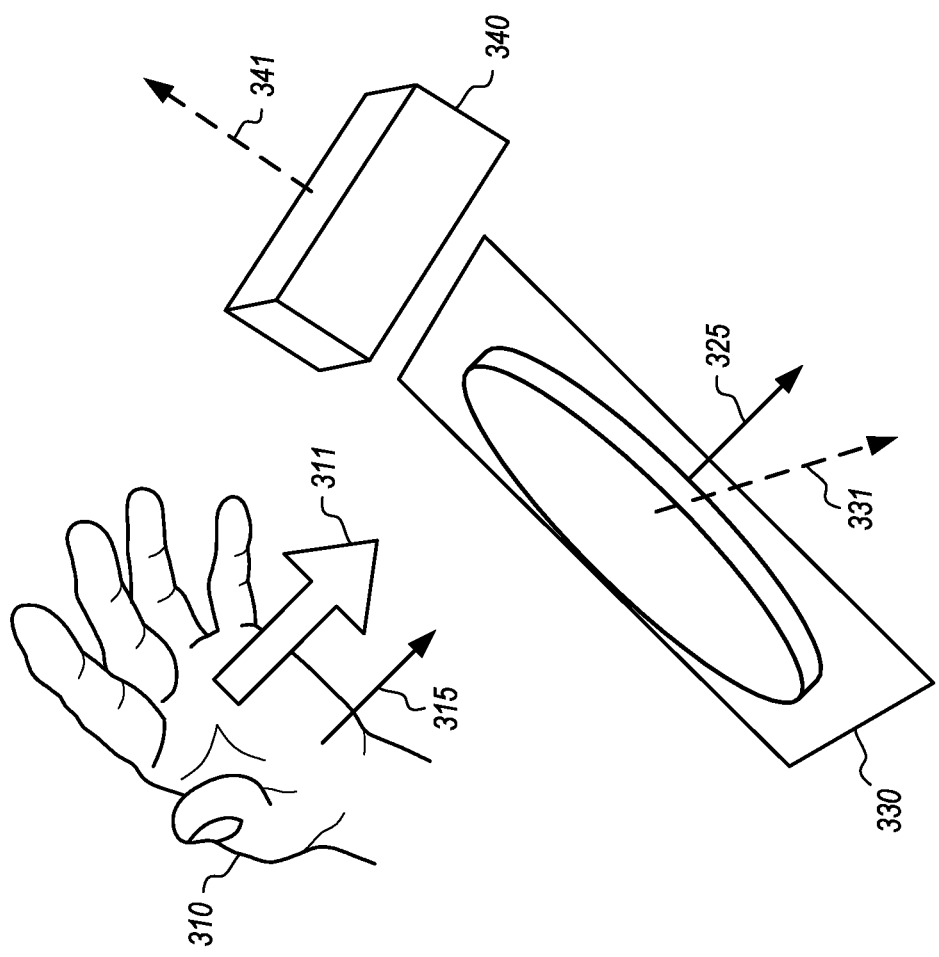
FIG. 3 illustrates a mixed-reality environment in which a user's hand interacts with different virtual objects having directional preferences of interaction.

FIG. 3 illustrates an embodiment in which a mixed-reality system uses additional/other constraints in detecting user-object interaction in a mixed-reality environment. In some instances, the user's grab region will include virtual objects that are intended to be interacted with in predefined and/or particular manners. By way of example, FIG. 3 depicts a user's hand 310 performing a semi-open-handed gesture toward two objects, a mixed-reality input element (e.g., button 330) and a virtual box 340 (the interaction region is not visually depicted for simplicity).

The physical counterparts of some virtual objects, such as button 330, have physical attributes that govern their real-world behavior. For example, a physical button may not be pressed from its back side. Thus, in some embodiments, it is beneficial to include additional/other constraints on mixed-reality buttons or other input elements to prevent unwanted interaction with such objects (e.g., an unintended, accidental press from the back side of a virtual button).

As before, the user's hand 310 has a controller orientation 311. The button 330 has an orientation affinity 331, and the box 340 also has an orientation affinity 341. By performing the processes detailed above with reference to FIG. 1, a mixed-reality system determines, in some embodiments, that the orientation similarity score between the controller orientation 311 and the orientation affinity 331 exceeds a predetermined threshold and is greater than the orientation similarity score between the controller orientation 311 and the orientation affinity 341. As such, button 330 is the most logical choice for becoming the subject of the interaction initiated by the user's gesture.

However, in some embodiments, the mixed-reality system takes additional/other measures to ensure that an unintended user-object interaction does not occur. For example, button 330 should not be able to be interacted with or pressed from its back side (as with a physical button). As such, if the user moved their hand 310 such that their hand 310 interfaced with the button 330 from its back side, the mixed-reality system should not execute an interaction between the user's hand 310 and button 330.

Therefore, in some embodiments, the mixed-reality system determines a directional component 315 of the controller gesture and a directional preference 335 for at least one virtual object (e.g., button 330) within the interaction region. The directional component is based, in some instances, on a detected motion characteristic of the user controller (e.g., hand 310). For example, in some embodiments, the directional component 315 is based on a velocity (e.g., directional movement) of the controller gesture, as determined by a detecting the position of a portion of the controller (e.g., hand 310) at a time when the controller initially interfaces with a virtual object (e.g., button 330) and at a time thereafter.

The directional preference for the virtual object within the interaction region indicates a direction in which the object should be interacted with to provide an intuitive user experience. For example, where the virtual object is a button, the directional preferences indicates a press direction, wherein the virtual button should only be able to be pressed in the press direction.

Continuing with FIG. 3, the directional component 315 of the user's hand 310 determined by the mixed-reality system is shown. As depicted, directional component 315 is based on the velocity of the user's hand. The directional preference 335 for the button 330 as determined by the mixed-reality system is also shown. Upon determining that the button 330 has the highest orientation similarity score that exceeds a threshold and that the directional component 315 of the controller (user's hand 310) complies with the directional preference 335 of button 330, the mixed-reality system executes an interaction between the user's hand 310 and button 330.

Those skilled in the art will recognize that the orientation affinity and the directional preference for a virtual object may be the same or different, depending on the circumstances. For example, a virtual handprint scanner would have its orientation affinity and directional preference in the same direction, whereas cabinet door knob may have its orientation affinity in one direction, but its directional preference in another. Furthermore, it should be noted that an object may have more than one directional preference. For instance, a cabinet door may have a directional preference for opening and a directional preference for closing, as well as additional similarity constraints for determining whether a controller directional component complies with one of the directional preferences. Also, it will be appreciated that the directional preference, controller orientation, and/or the axis of directionality for a controller may point in the same or different directions.

In some implementations, this functionality prevents the user from inadvertently interacting with direction-specific virtual content, such as virtual buttons or virtual doors, or other virtual input receivers.

Figure 4B:
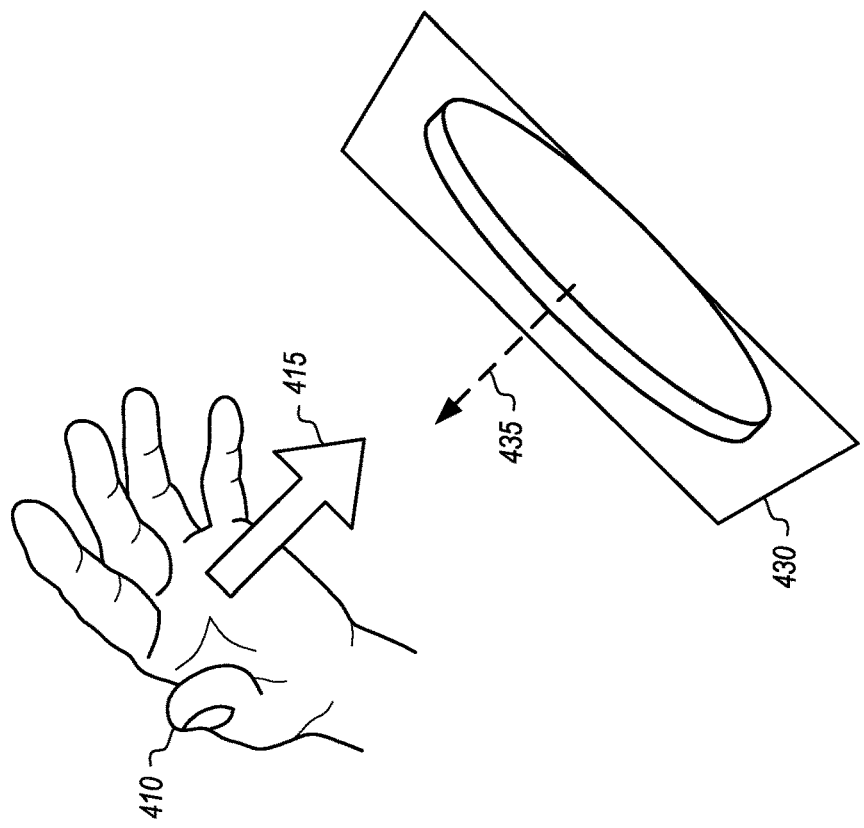
FIGS. 4A and 4B illustrate additional embodiments in which directional constraints are used for facilitating user-object interactions in a mixed-reality environment.
Figure 4A:
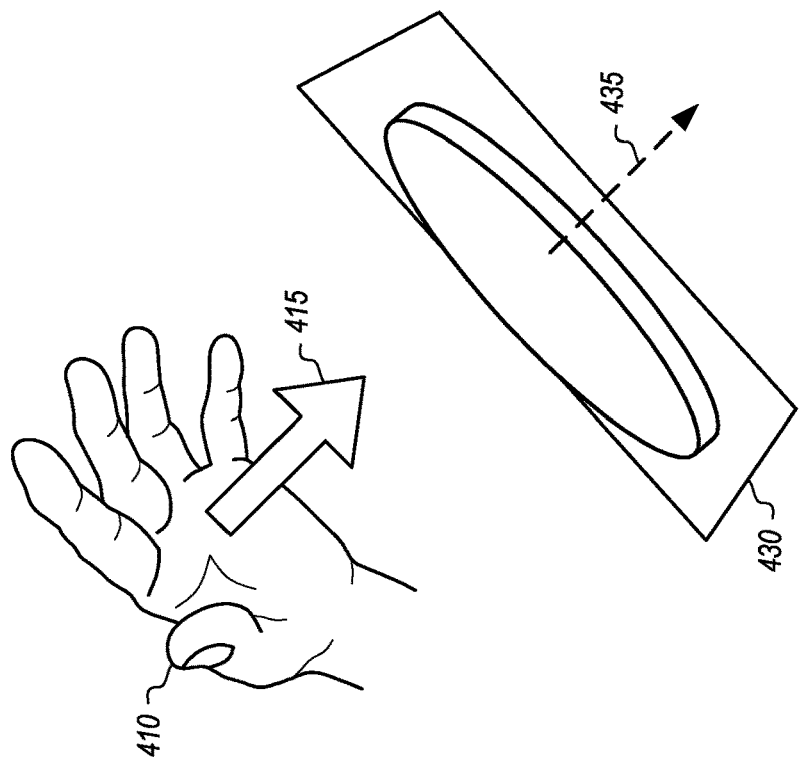

FIGS. 4A and 4B illustrate embodiments in which a mixed-reality system uses directional constraints in detecting user-object interaction in a mixed-reality environment. Although the mixed-reality system embodiment described hereinabove with reference to FIG. 3 executed a user-object interaction in a mixed-reality environment based on both orientation similarity scores and compliance with directional preferences, it will be appreciated that a mixed-reality system may facilitate user-object interaction by only focusing on compliance with directional preferences. For example, simple virtual buttons might be agnostic toward the controller orientation of a user controller, focusing only on whether the virtual button is pushed from the correct direction.

Accordingly, FIGS. 4A and 4B both illustrate a user controller (embodied as a user's hand 410) with a directional component 415 (no controller orientation or interaction region is shown) and a mixed-reality input element (embodied as a virtual button 430) with a selectively triggerable input and an associated directional preference 435. In the illustrated embodiments, the user's hand 410 performs a gesture, detected by the mixed-reality system, that corresponds with the user's hand 410 interacting with the virtual button 430.

The virtual button 430 in FIG. 4A has a directional preference 435 that is in substantially the same direction as the directional component 415 of the user's hand 410, whereas the virtual button 430 in FIG. 4B has a directional preference 435 that substantially opposes the directional component 415 of the user's hand 410. Thus, when the user's hand 410 of FIG. 4A interacts with the virtual button 430 of FIG. 4A, the mixed-reality system will detect a match between the directional component 415 of the user gesture and the directional preference 435 of the virtual button 430, and the system will selectively trigger the input associated with the virtual button 430.

In contrast, when the user's hand 410 of FIG. 4B interacts with the virtual button 430 of FIG. 4B, the mixed-reality system will not detect a match between the directional component 415 of the user gesture and the directional preference 435 of the virtual button 430, and the system will fail to accept or trigger the input (e.g., gesture) associated with the virtual button 430 in response to the user's hand 410 touching or crossing a display surface of the virtual button 430.

Figure 5:
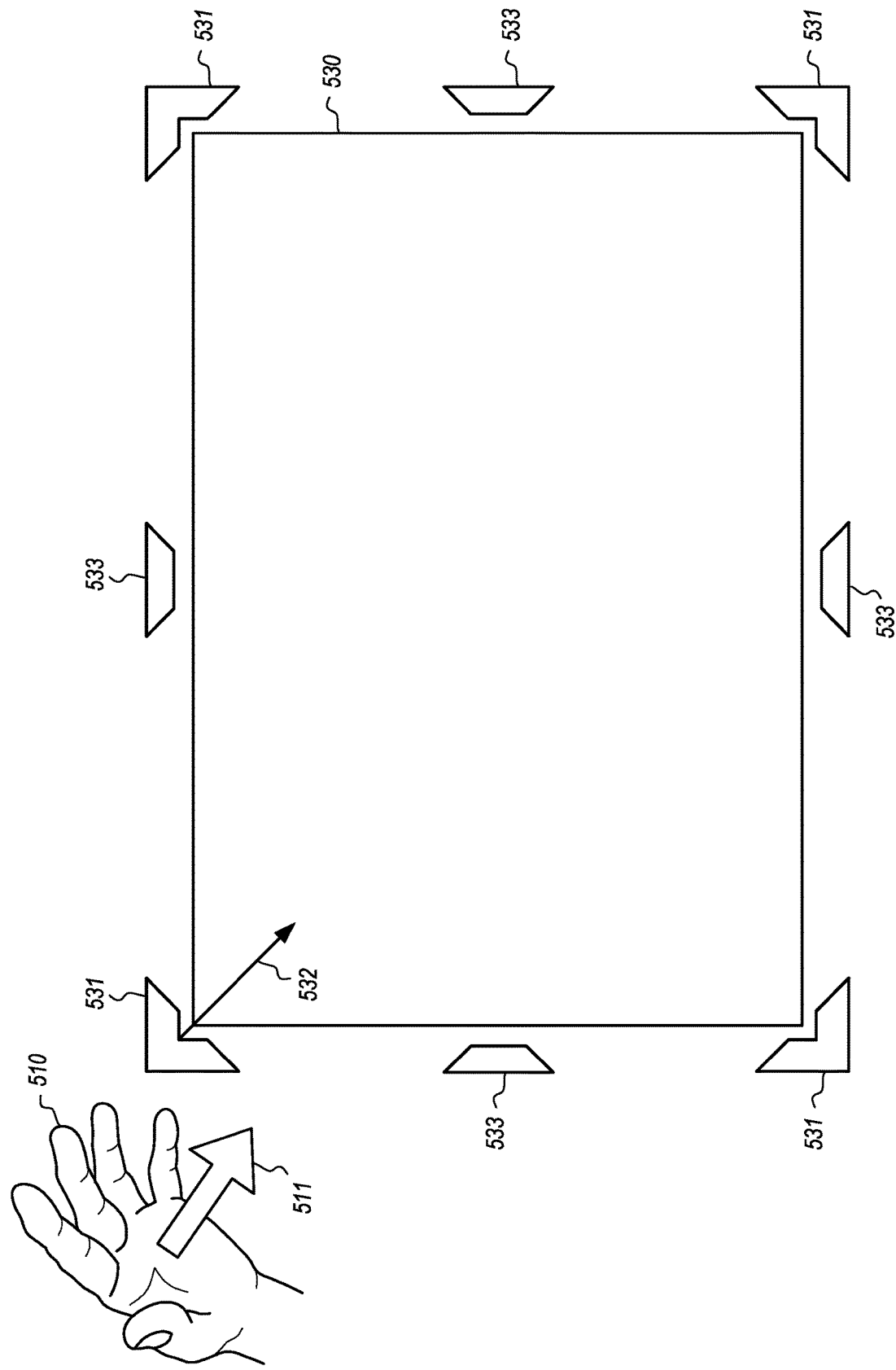
FIG. 5 illustrates additional embodiments for facilitating user-object interaction based on directional constraints in mixed-reality environments.

Attention is now directed to FIG. 5, which illustrates an exemplary embodiment of a mixed-reality system detecting user-object interaction in a mixed-reality environment, according to the present disclosure. FIG. 5 shows a mixed-reality tablet hologram 530 which includes corner affordances 531 and side affordances 533 which users may interact with in order to resize the mixed-reality tablet 530. Users, however, typically move their hand or controller (e.g., hand 510) through the affordances 531, 533 in order to interact with the content displayed on the mixed-reality tablet 530. This movement can cause inadvertent interactions with the affordances 531, 533 of a mixed-reality tablet 530.

In order to prevent unintended interaction with the affordances 531, 533 of the mixed-reality tablet 530, the mixed-reality system embodiment shown in FIG. 5 only executes an interaction between a controller (e.g., a user's hand 510) and a virtual object (e.g., an affordance 531, 533 of a mixed-reality tablet 530) upon determining that a pose of the controller corresponds to an interactive pose. Typically, users interact with affordances of mixed-reality tablets by forming a pinching pose with their hand (with their thumb exerting force against one or more fingers).

Accordingly, the mixed-reality system embodiment of FIG. 5 defines a pinching pose as an interactive pose for affordances 531, 533 of a mixed-reality tablet 530. Therefore, the mixed-reality system will only execute an interaction between a controller (e.g., a user's hand 510) and an affordance 531, 533 when the controller or hand is forming a pinching pose at the time of a user's gesture.

The user hand 510 illustrated in FIG. 5 is gesturing so as to move through a corner affordance 531 of the mixed-reality tablet 530 (e.g., to interact with virtual content of the mixed-reality tablet 530). The user's hand 510 is in a semi-open position, which is not considered an interactive pose with respect to affordances 531, 533 of mixed-reality tablet 530. As such, even though the user's hand 510 has a controller orientation 511 that is substantially in the same direction as an orientation affinity 532 of the corner affordance 531 and the affordance 531 may be in an interaction region created by the gesture of the user's hand, the mixed-reality system will not execute an interaction between the user's hand 510 and the corner affordance 531.

Figure 6C:
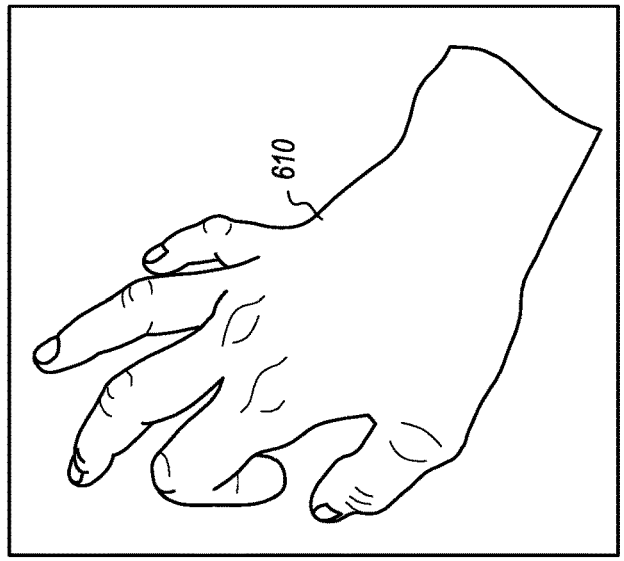
FIGS. 6A-6C illustrate exemplary poses that are detectable by a mixed-reality system when detecting user-object interaction in mixed-reality environments.
Figure 6B:
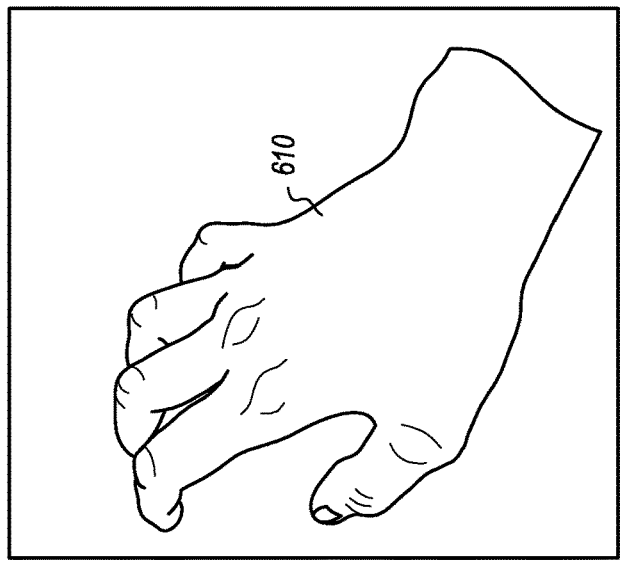
Figure 6A:
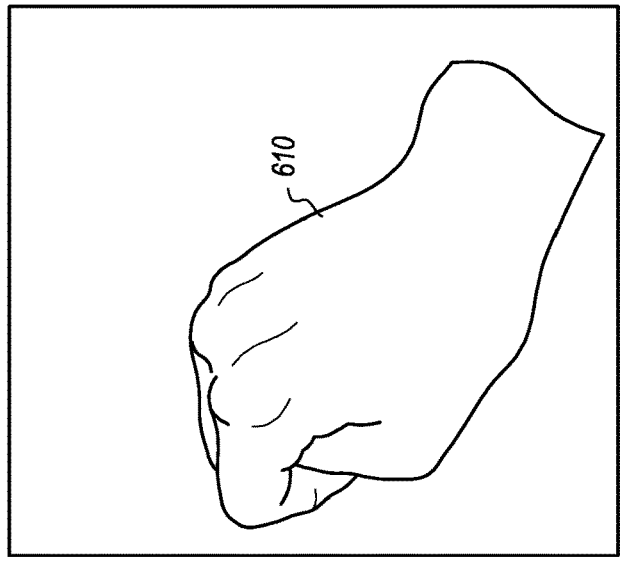

Continuing with the discussion of interactive poses, FIGS. 6A-6C illustrate some non-limiting exemplary poses that are detectable by a mixed-reality system when detecting user-object interaction in a mixed-reality environment. FIG. 6A shows a user's hand 610 in a closed fist pose. A closed fist might be considered, in some instances, a non-interactive pose for most or all mixed-reality object interaction. Thus, in some implementations, when a user moves their hand 610 in a closed fist pose through or in close proximity to interactable virtual objects or virtual input elements, the mixed-reality system will selectively ignore the input and refrain from executing the user-object interactions.

Alternatively, certain poses may be required to process input, such as a hand positioned in a peace sign. In this regard, the controller pose can include controller properties (e.g., velocity, pose, sequence of poses, orientation, etc.) that are mapped to one or more input element affinities or property sets that selectively enable or disable the input receiving mode of the input element to receive or, alternatively, to ignore input from a corresponding controller.

FIG. 6B illustrates a user's hand 610 in a grabbing pose, with the thumb opposing all of the user's fingers (e.g., so as to grab a ball or another object). As described above, a grab pose may be defined as an interactive pose for grabbing/picking up certain objects (e.g., boxes, balls, models, etc.). This pose may be used to trigger the application/display of an interaction region for selectively identifying objects within that region to be interacted with based on corresponding directional affinities.

As described above in relation to FIG. 5, a pinch pose may be defined as the only interactive pose for affordances, and may also operate as an interactive pose in other contexts for applying an interaction region and/or for calculating directional and orientation affinities.

FIG. 6C illustrates a similar pinching pose, but the thumb only opposes the user's index finger (with the other fingers extended). Such a pose may be a defined interactive pose where the virtual object is a small object (e.g., a small marble), such that interactions therewith should be constrained to a deliberate hand pose such as the one shown in FIG. 6C.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7:
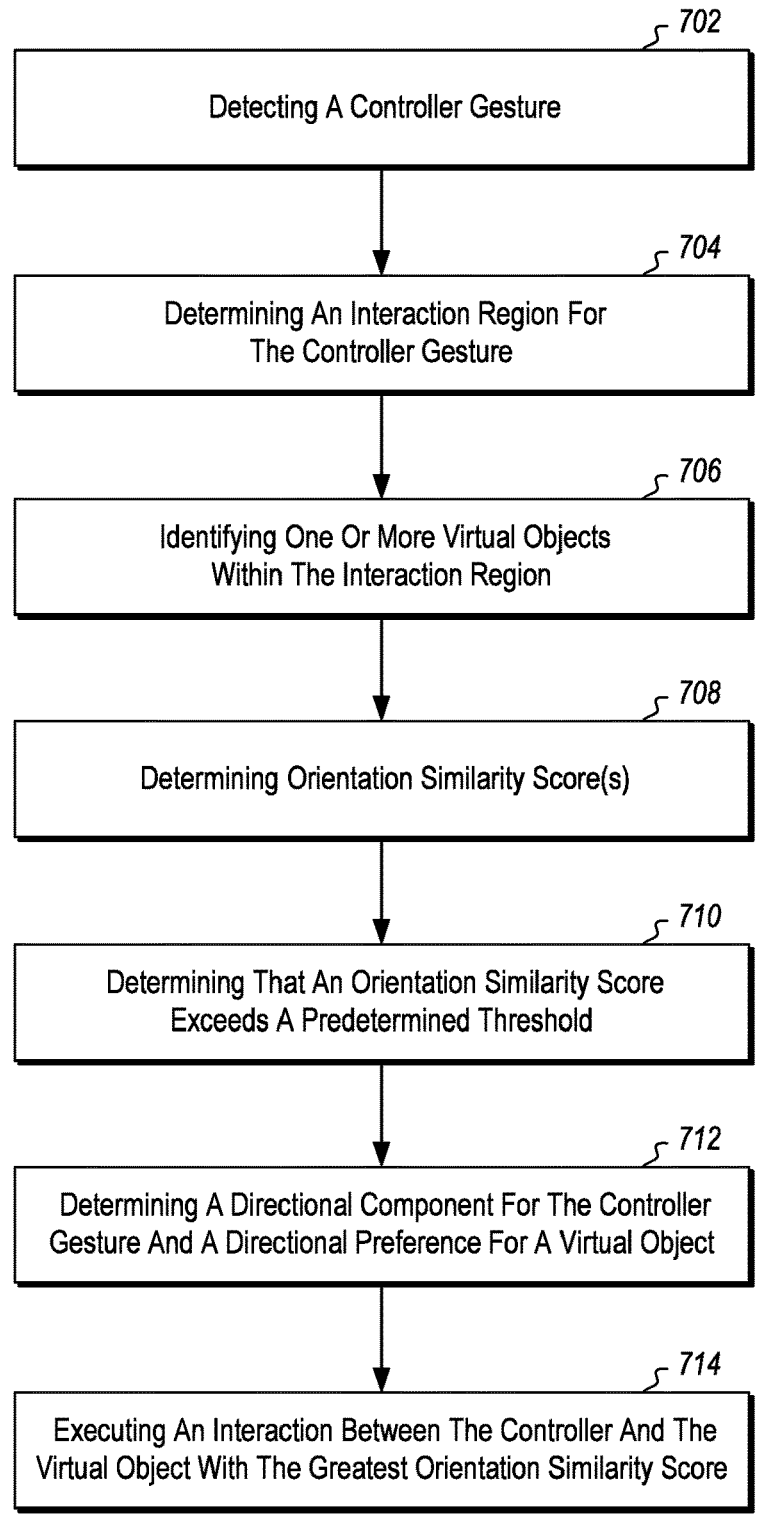
FIG. 7 shows an exemplary flow diagram associated with methods for detecting user-object interactions in mixed-reality environments.

FIG. 7 shows an exemplary flow diagram depicting a method 700 for detecting user-object interaction in a mixed-reality environment. Method 700 includes acts of detecting a controller gesture (702), determining an interaction region for the controller gesture (704), identifying one or more virtual objects within the interaction region (706), determining orientation similarity score(s) (708), determining that an orientation similarity score exceeds a predetermined threshold (710), determining a directional component for the controller gesture and a directional preference for a virtual object (712), and executing an interaction between the controller and the virtual object with the greatest orientation similarity score (714).

Act 702 of method 700 includes detecting a controller gesture. In some embodiments, the controller gesture amounts to a grab, push, slide, pull, press, rotation, or other gesture directed toward one or more virtual objects in a mixed-reality environment. Furthermore, in some embodiments, the gesture has an associated controller orientation, which identifies an interaction orientation for the controller and may be based on various parts of the controller and/or a pose of the controller.

Act 704 of method 700 includes determining an interaction region for the controller gesture. In some embodiments, the interaction region defines which objects the user's gesture is directed toward, thus defining a set of virtual objects that the user may be attempting to interact with. In certain implementations, the interaction region corresponds to a conical, spherical, cylindrical, pyramidal, or prismatic region, and the interaction region is identified based on attributes of the user's gesture of act 702, such as pose and/or motion characteristics, and/or other environmental or user activity factors.

Act 706 of method 700 includes identifying one or more virtual objects within the interaction region. The virtual objects within the interaction region, in some embodiments, each include an orientation affinity, which defines for each object an orientation parameter that a user's controller must conform to in order to interact with the object.

Act 708 of method 700 includes determining orientation similarity score(s), in particular between the controller orientation and the orientation affinity for each one of the virtual objects within the interaction region. The mixed-reality system performs this step to rank the virtual objects in the interaction region (e.g., candidates) in order of the directional similarity they share with the controller orientation of the user's gesture.

The orientation similarity scores between the controller orientation and each of the orientation affinities of the virtual objects may be determined in a variety of ways. In some embodiments, the mixed-reality system determines a dot product between the controller orientation and each orientation affinity separately and utilizes the dot product values as the orientation similarity scores. In some embodiments, the mixed-reality system utilizes a different method to formulate orientation similarity scores between the controller orientation and the various orientation affinities, such as cosine similarity or normalized measures of Euclidean distance, Manhattan distance, or Minkowski distance.

Act 710 of method 700 includes determining that an orientation similarity score exceeds a predetermined threshold. In some instances, requiring a threshold to be met before executing an interaction prevents undesired user-object interactions in mixed-reality environments, in particular where the highest orientation similarity score only indicates low similarity between the controller orientation and the orientation affinity.

Act 712 of method 700 includes determining a directional component for the controller gesture and a directional preference for a virtual object. The directional component is based, in some instances, on a detected motion characteristic of the user controller. For example, in some embodiments, the directional component is based on a velocity of the controller gesture, as determined by a detecting the position of a portion of the controller at a time when the controller initially interfaces with a virtual object and at a time thereafter. The directional preference for the virtual object within the interaction region indicates a direction in which the object should be interacted with to provide an intuitive user experience. For example, where the virtual object is a button, the directional preferences indicates a press direction, wherein the virtual button should only be able to be pressed in the press direction.

Act 714 of method 700 includes executing an interaction between the controller and the virtual object with the greatest orientation similarity score. In some embodiments, the mixed-reality system only executes the interaction upon determining that the directional component of the controller gesture complies with the directional preference for at least one of the virtual objects in the interaction region and/or upon determining that the pose of the controller corresponds to an interactive pose. This determination may occur by examining a stored mapping between directional component (s) of controller gesture(s) and directional preference(s) of virtual object(s) in one or more data structures (not shown) stored in the storage of the system (e.g., storage 1225) or a remote system 1240. In some implementations, the virtual object upon which an interaction is executed is the object that the user intended to initiate an interaction with, rather than an unintended object.

Figure 8:
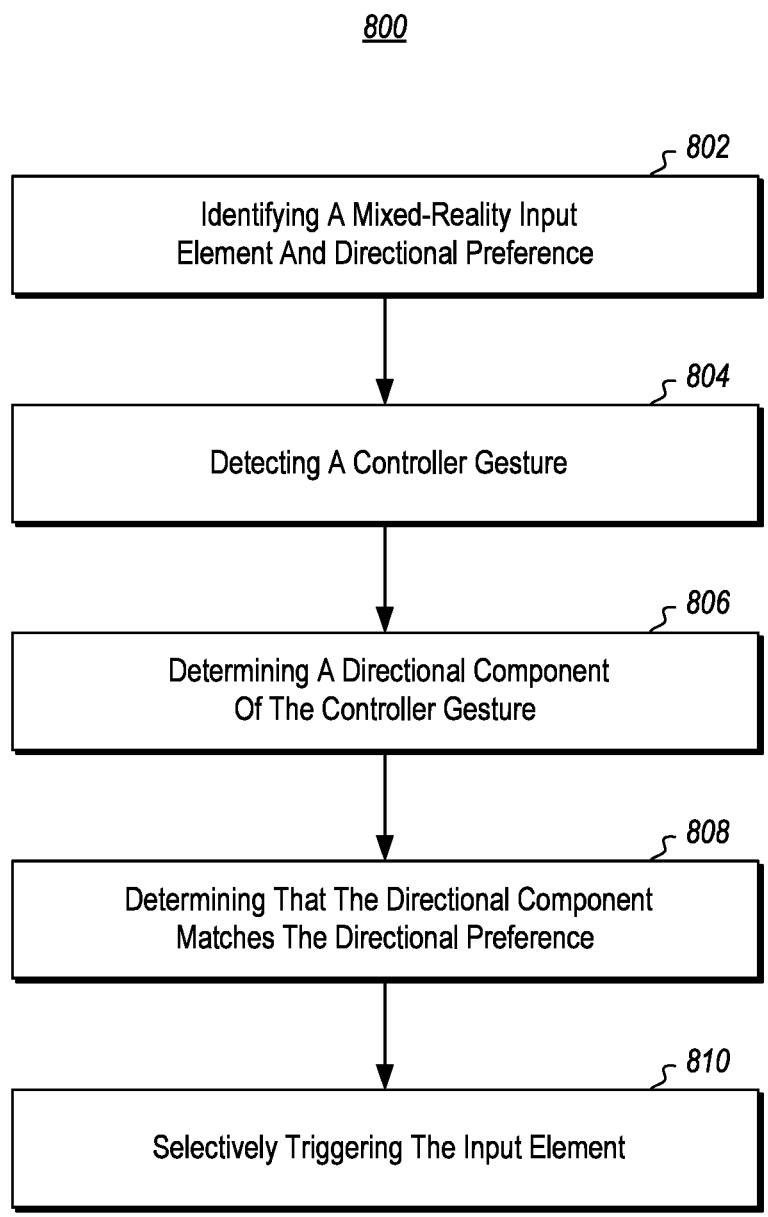
FIG. 8 shows an exemplary flow diagram associated with methods for detecting user-object interactions in mixed-reality environments using directional constraints.

FIG. 8 shows an exemplary flow diagram depicting a method 800 for detecting and applying user-object interaction in a mixed-reality environment using directional constraints. Method 800 includes acts of identifying a mixed-reality input element and directional preference (802), detecting a controller gesture (804), determining a directional component of the controller gesture (806), determining that the directional component matches the directional preference (808), and selectively triggering the input element (810).

Act 802 of method 800 includes identifying a mixed-reality input element and directional preference, wherein the mixed-reality input element includes an input that is selectively triggered. The directional preference for the virtual object within the interaction region indicates a direction in which the object should be interacted with to provide an intuitive user experience. For example, where the virtual object is a button, the directional preferences indicates a press direction, wherein the virtual button should only be able to be pressed in the press direction.

Act 804 of method 800 includes detecting a controller gesture. In some embodiments, the controller gesture amounts to a grab, push, slide, pull, press, rotation, or other gesture directed toward one or more virtual objects in a mixed-reality environment.

Act 806 of method 800 includes determining a directional component of the controller gesture. The directional component is based, in some instances, on a detected motion characteristic of the user controller. For example, in some embodiments, the directional component is based on a velocity of the controller gesture, as determined by a detecting the position of a portion of the controller at a time when the controller initially interfaces with a virtual object and at a time thereafter.

Act 808 of method 800 includes determining that the directional component matches the directional preference. In some embodiments, determining a match between is a simple binary determination. In other embodiments, additional directional constraints are involved, such as a threshold value for a dot product between the directional component and the directional preference.

Act 810 of method 800 includes and selectively triggering the input element, in particular the input associated with the mixed-reality input element. In some embodiments, the input is selectively triggered in response to determining that the directional component of the controller gesture matches the directional preference of the mixed-reality input element.

Figure 9:
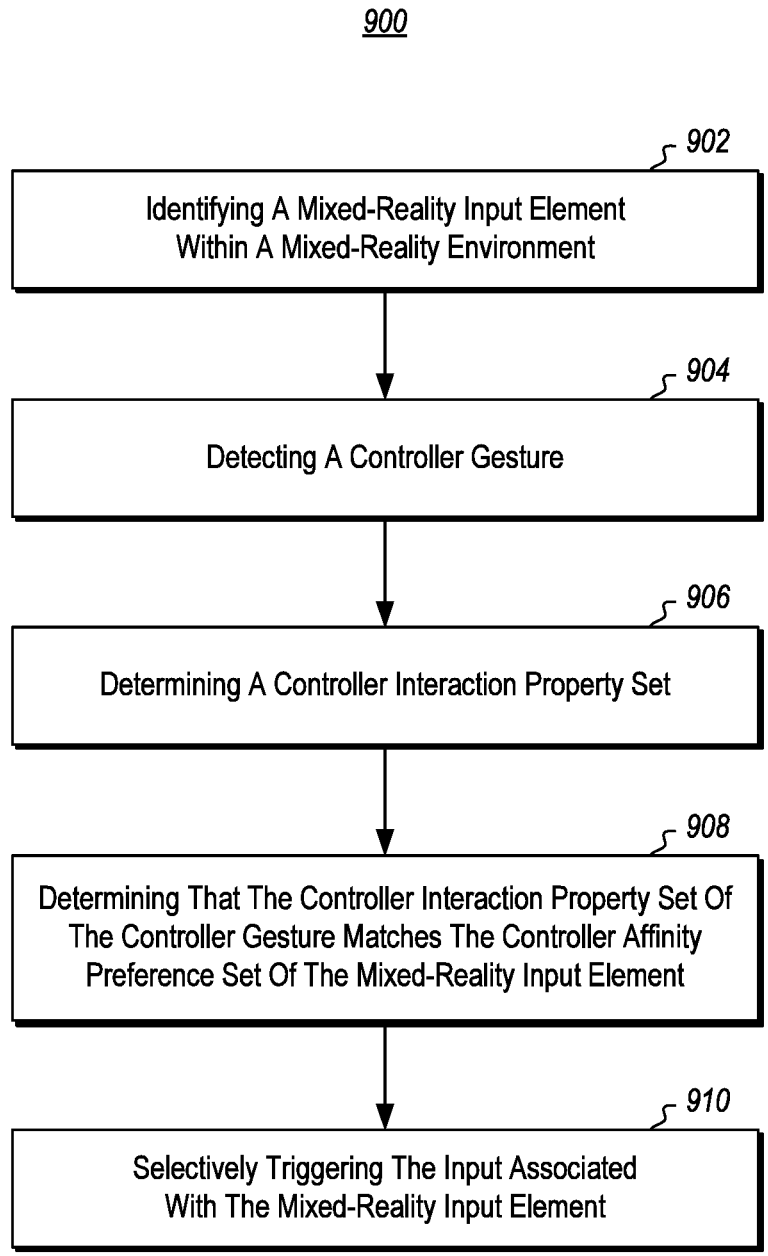
FIG. 9 shows an exemplary flow diagram associated with methods for selectively triggering input with mixed-reality input elements in mixed-reality environments based on detecting mappings/matches between an input element's controller affinity preference set and an interaction property set of an interacting controller.

FIG. 9 shows an exemplary flow diagram depicting a method 900 for selectively triggering input with a mixed-reality input element in a mixed-reality environment based on detecting matches between the input element's controller affinity preference set and the interaction property set of an interacting controller. Method 900 includes acts of identifying a mixed-reality input element within a mixed-reality environment (902), detecting a controller gesture (904), determining a controller interaction property set (906), determining that the controller interaction property set of the controller gesture matches the controller affinity preference set of the mixed-reality input element (908), and selectively triggering the input associated with the mixed-reality input element (910).

Act 902 of method 900 includes identifying a mixed-reality input element within a mixed-reality environment. In some embodiments, the mixed-reality input element includes an input that is selectively triggered, such as a mixed-reality button, keyboard, touch screen, affordance, or other input element. Furthermore, in some embodiments, the mixed-reality input element has an associated controller affinity preference set. The controller affinity preference set, in some implementations, defines constraints for receiving interaction of a user controller for selectively triggering the input, such that the input only becomes selectively triggered when the constraints are complied with.

Act 904 of method 900 includes detecting a controller gesture. In some embodiments, the controller gesture corresponds with the user controller interacting with the mixed-reality input element. By way of example, in one instance, the controller gesture is a user manipulating a controller, such as their hand, to interface with or press a mixed-reality button or other input device. In another instance, the controller gesture is a grab gesture for grabbing a mixed-reality object.

Act 906 of method 900 includes determining a controller interaction property set. In some instances, the controller interaction property set is determined as the user controller interacts with the mixed-reality input element. For example, when a user interfaces with a virtual button, the mixed-reality system determines a controller interaction property set at the time the user interfaces with the virtual button. The controller interaction property set can include any properties described hereinabove, such as a controller orientation, directional component, pose, sequence of poses, motion characteristic, axis of directionality, or other attributes or characteristics of the controller.

Act 908 of method 900 includes determining that the controller interaction property set of the controller gesture matches the controller affinity preference set of the mixed-reality input element. In some embodiments, this is performed by comparing one or more properties of the controller interaction property set with one or more affinity preferences of the controller affinity preference set of the mixed-reality input element. This may include determining whether a threshold value associated with a property and/or affinity preference is exceeded, such as directional similarity, velocity, orientation, directional preference/component, pose characteristics (e.g., whether in an interactive pose or non-interactive pose), sequence of poses, etc.

Act 910 of method 900 includes selectively triggering the input associated with the mixed-reality input element, such as by triggering the input of a mixed-reality button, touch screen, or other object or input receiver consequent to the detected controller gesture for interacting with the mixed-reality input element. As such, the mixed-reality system is configurable to only selectively trigger the input associated with the mixed-reality input element in response to determining that the controller interaction property set of the controller gesture matches the controller affinity preference set of the mixed-reality input element.

Figure 10:
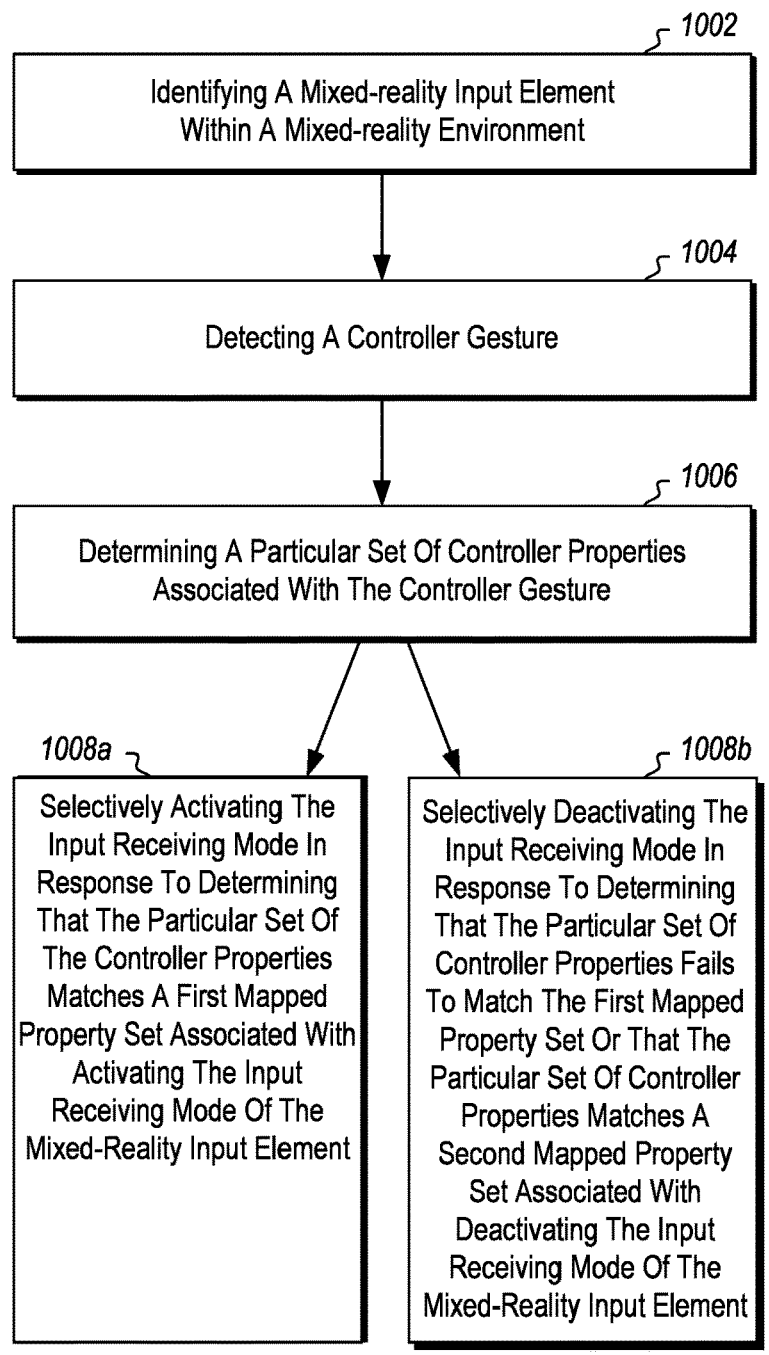
FIG. 10 shows an exemplary flow diagram associated with methods for selectively activating or deactivating an input receiving mode of one or more mixed-reality input elements in a mixed-reality environment based on detecting a particular set of controller properties in a mixed-reality environment.

FIG. 10 shows an exemplary flow diagram depicting a method 1000 for selectively activating or deactivating an input receiving mode of one or more mixed-reality input elements in a mixed-reality environment based on detecting a particular set of controller properties in the mixed-reality environment. Method 1000 includes acts of identifying a mixed-reality input element within a mixed-reality environment (1002), detecting a controller gesture (1004), determining a particular set of controller properties associated with the controller gesture (1006), and either (a) selectively activating the input receiving mode in response to determining that the particular set of the controller properties matches a first mapped property set associated with activating the input receiving mode of the mixed-reality input element (1008*a*), or (b) selectively deactivating the input receiving mode in response to determining that the particular set of controller properties fails to match the first mapped property set or that the particular set of controller properties matches a second mapped property set associated with deactivating the input receiving mode of the mixed-reality input element (1008*b*).

Act 1002 of method 1000 includes an act of identifying a mixed-reality input element within a mixed-reality environment. In some embodiments, the mixed-reality input element includes an input receiving mode. When the input receiving mode is activated, the system enables user input received at the mixed-reality input element for triggering an input function of the mixed-reality input element based on the user input (such as the pressing of a button, the grabbing of an object, etc.). When the input receiving mode is deactivated, on the other hand, the system ignores user input directed at the mixed-reality input element so that the mixed-reality input element is not used to trigger the input function.

Act 1004 of method 1000 includes detecting a controller gesture. In some embodiments, the controller gesture corresponds with the user controller interacting with the mixed-reality input element. By way of example, in one instance, the controller gesture is a user manipulating a controller, such as their hand, to interface with or press a mixed-reality button or other input device. In another instance, the controller gesture is a grab gesture for grabbing a mixed-reality object.

Act 1006 of method 1000 includes determining a particular set of controller properties associated with the controller gesture. In some instances, the particular set of controller properties associated with the controller gesture can include any properties described hereinabove, such as a controller orientation, directional component, pose, sequence of poses, motion characteristic (e.g., velocity), axis of directionality, or other attributes or characteristics of the controller.

Act 1008*a* includes an act selectively activating the input receiving mode in response to determining that the particular set of the controller properties matches a first mapped property set associated with activating the input receiving mode of the mixed-reality input element. Act 1008*b* includes an act of selectively deactivating the input receiving mode in response to determining that the particular set of controller properties fails to match the first mapped property set or that the particular set of controller properties matches a second mapped property set associated with deactivating the input receiving mode of the mixed-reality input element.

The mapped property sets (e.g., first and second mapped property sets) associated with activating or deactivating the input receiving mode of the mixed-reality input element can include any properties described hereinabove, such as a controller orientation, directional component, pose, sequence of poses, motion characteristic (e.g., velocity), axis of directionality, or other attributes or characteristics of the controller.

In some embodiments, the first mapped property set associated with activating the input receiving mode of the mixed-reality input element corresponds to constraints/conditions defined for activating the input receiving mode. Accordingly, the input receiving mode of the mixed-reality input element is only selectively activated when the particular set of controller properties matches the first mapped property set.

Furthermore, in some embodiments, the second mapped property set associated with deactivating the input receiving mode of the mixed-reality input element corresponds with constraints/conditions defined for deactivating the input receiving mode. Thus, the input receiving mode of the mixed-reality input element becomes (or remains) deactivated if the conditions for deactivation are met, or the constraints of the first mapped property set are not met.

Additionally, in some embodiments, the method further includes determining whether the particular set of controller properties matches a first or second mapped property set of a second mixed-reality input element. This may occur, for example, when two mixed-reality input elements are in close proximity to the controller/gesture (e.g., within an interaction region of a controller) and are concurrently being rendered in the mixed-reality environment.

As with the previously mentioned mixed-reality input element (first mixed-reality input element), the first mapped property set of the second mixed-reality input element is associated with activating an input receiving mode of the second mixed-reality input element, and the second mapped property set of the second mixed-reality input element is associated with deactivating the input receiving mode of the second mixed-reality input element.

In some embodiments, upon determining that the particular set of controller properties matches the first mapped property set of the first mixed-reality input element (for activating the input receiving mode of the first mixed-reality input element) and also matches the second mapped property set of the second mixed-reality input element (for deactivating the input receiving mode of the second mixed-reality input element), the system simultaneously and selectively deactivates the input receiving mode of the second mixed-reality input element.

In another scenario, upon determining that the particular set of controller properties matches the second mapped property set of the first mixed-reality input element (for deactivating the input receiving mode of the first mixed-reality input element) and also matches the first mapped property set of the second mixed-reality input element (for activating the input receiving mode of the second mixed-reality input element), the system simultaneously and selectively activates the input receiving mode of the second mixed-reality input element.

Figure 11:
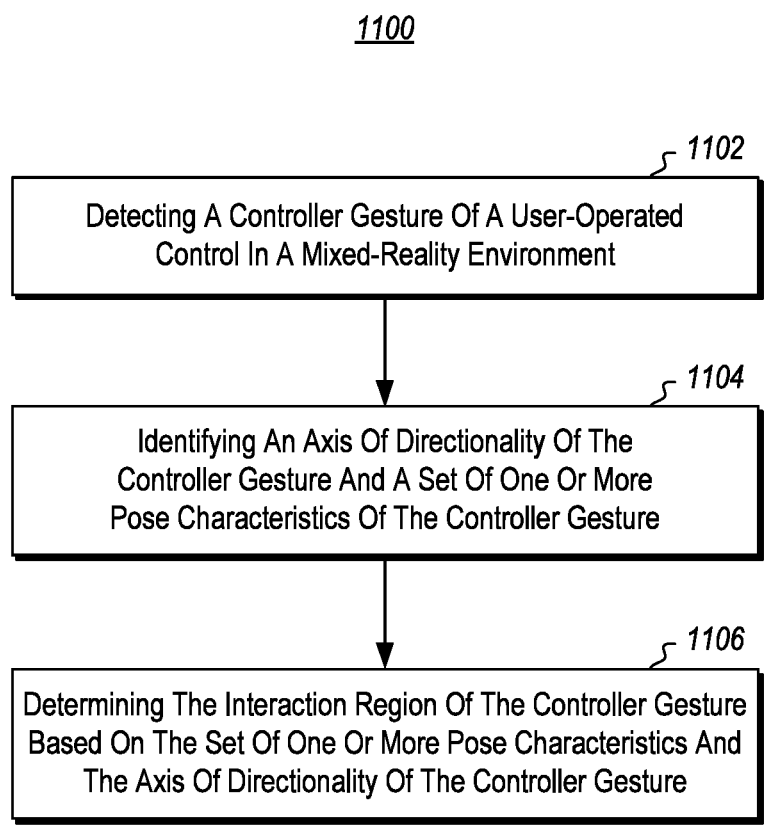
FIG. 11 shows an exemplary flow diagram associated with methods for determining an interaction region for a controller gesture in a mixed-reality environment and for facilitating object interaction in the mixed-reality environment with one or more virtual objects in the interaction region.

FIG. 11 shows an exemplary flow diagram depicting a method 1100 for determining an interaction region for a controller gesture in a mixed-reality environment for facilitating object interaction in the mixed-reality environment between a user and one or more virtual objects in the interaction region. Method 1100 includes acts of detecting a controller gesture of a user-operated controller in a mixed-reality environment (1102), identifying an axis of directionality of the controller gesture and a set of one or more pose characteristics of the controller gesture (1104), and determining the interaction of the controller gesture based on the set of one or more pose characteristics and the axis of directionality of the controller gesture (1106).

Act 1102 of method 1100 includes detecting a controller gesture of a user-operated controller in a mixed-reality environment. In some embodiments, the controller gesture amounts to a grab, push, slide, pull, press, rotation, or other gesture directed toward one or more virtual objects in a mixed-reality environment. Furthermore, in some embodiments, the controller gesture is configured for initiating interaction between the user-operated controller and the virtual object(s) in the mixed-reality environment.

Act 1104 of method 1100 includes identifying an axis of directionality of the controller gesture and a set of one or more pose characteristics of the controller gesture. In some embodiments, the axis of directionality of the controller gesture corresponds to an orientation of the user-operated controller and is based on a pose characteristic of the controller (e.g., an angular relationship between different elements/aspects of the controller, such as fingers of a hand) and/or a motion characteristic of the controller (e.g., velocity of a user's hand). In some embodiments, the axis of directionality is in the same direction as the directional component or controller orientation of the controller, as described hereinabove. Furthermore, the set of one or more pose characteristics of the controller gesture can include any characteristics or properties described hereinabove, such as a controller orientation, directional component, pose, sequence of poses, motion characteristic (e.g., velocity), or other attributes or characteristics of the controller.

Act 1106 of method 1100 includes determining the interaction region of the controller gesture based on the set of one or more pose characteristics and the axis of directionality of the controller gesture. In some embodiments, the interaction region is configured for identifying one or more virtual objects in the mixed-reality environment to be interacted with by the user-operated controller. This is accomplished, in some instances, by configuring the interaction region to define a volumetric region in the mixed-reality environment to identify mixed-reality objects within the volume/region.

The shape of the interaction region (volume), in some embodiments, is based on the set of one or more pose characteristics of the controller gesture of the user-operated controller. For instance, different shapes for the interaction region may be associated with different pose and/or motion characteristics of the controller/gesture. By way of example, the interaction region may be shaped as a conical or prismatic region upon detecting a first particular pose (e.g., a pinching pose where the user's index thumb and fingers form a particular shape and/or angular relationship) in the set of pose characteristics, and the interaction region may be shaped as a spherical region upon detecting a second particular pose (e.g., a grabbing pose where the user's thumb and fingers form a different shape and/or angular relationship) in the set of pose characteristics.

In some implementations, the size of the interaction region is based on the set of pose characteristics or motion characteristics of the user-operated controller. For example, when the user controller has an associated velocity, the size of the interaction region may be enlarged in the direction of the velocity of the user controller. In another example, when the shape of the interaction region is conical, the aperture of the cone will depend on the angular relationship between the fingers of the user's hand (e.g., the angle between the user's thumb and index finger).

Furthermore, in some embodiments, the orientation of the interaction region is based on the axis of directionality of the controller gesture. Thus, in some instances, the interaction region extends from the controller along the axis of directionality, and the orientation of the interaction region corresponds to the axis of directionality of the controller.

The disclosed embodiments may, in some instances, provide various advantages over conventional systems and methods for detecting user-object interaction in mixed-reality environments. Some of these advantages include providing users with functionality that ameliorates and/or eliminates unintentional user-object interactions with virtual objects and/or virtual input elements in mixed-reality environments.

Figure 12:
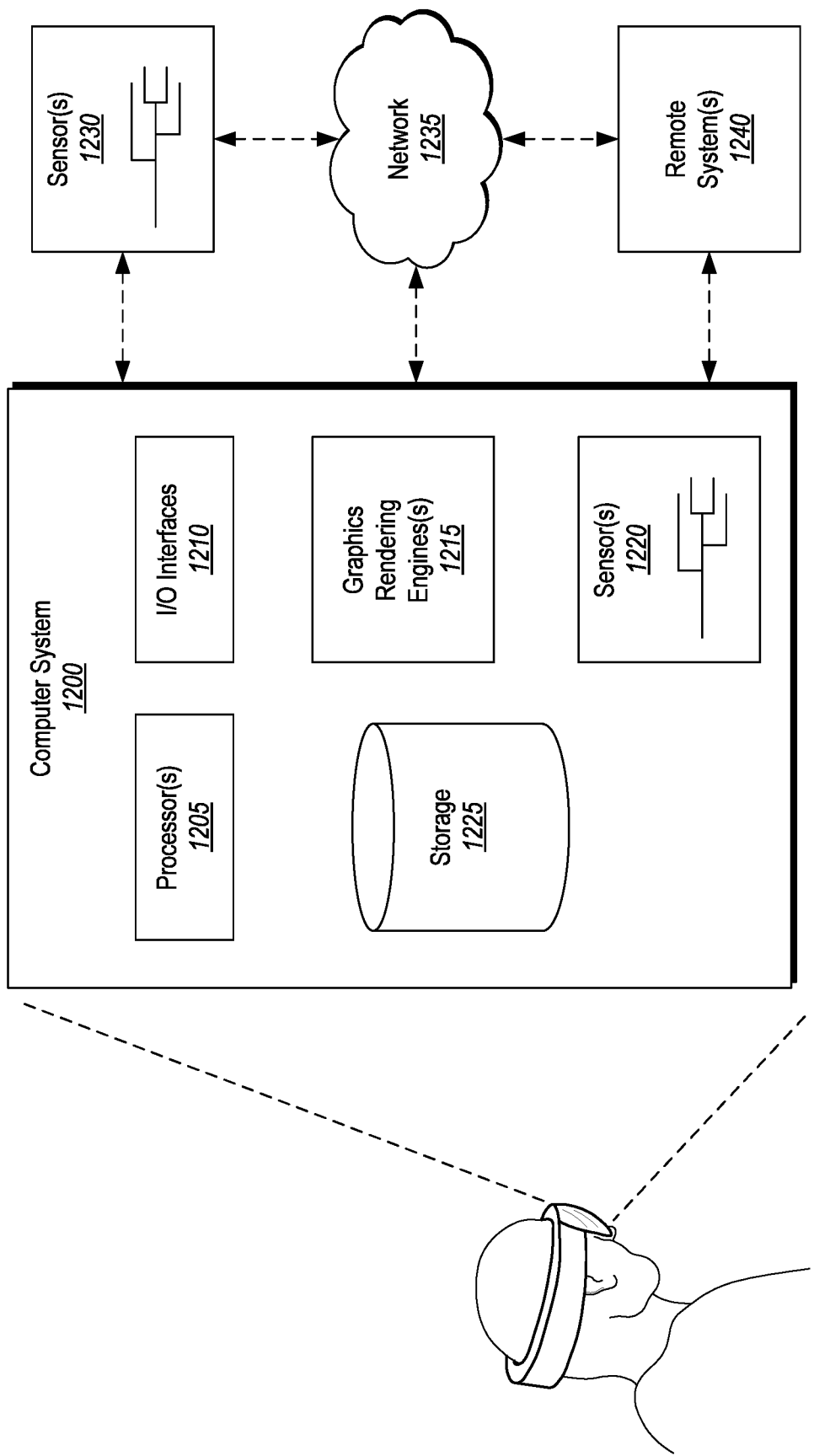
FIG. 12 illustrates an exemplary computer system that may include and/or be used to perform at least a portion of the disclosed and claimed embodiments.

Having just described the various features and functionalities of some of the disclosed embodiments, attention is now directed to FIG. 12, which illustrates an example computer system 1200 that may be used to facilitate the operations described herein.

The computer system 1200 may take various different forms. For example, in FIG. 12, the computer system 1200 is embodied as a head-mounted display (HMD). Although the computer system 1200 may be embodied as a HMD, the computer system 1200 may also be a distributed system that includes one or more connected computing components/devices that are in communication with the HMD. Accordingly, the computer system 1200 may be embodied in any form and is not limited strictly to the depiction illustrated in FIG. 12. By way of example, the computer system 1200 may include a projector, desktop computer, a laptop, a tablet, a mobile phone, server, data center and/or any other computer system.

In its most basic configuration, the computer system 1200 includes various different components. For example, FIG. 12 shows that computer system 1200 includes at least one hardware processing unit 1205 (aka a "processor"), input/output (I/O) interfaces 1210, graphics rendering engines 1215, one or more sensors 1220, and storage 1225. More detail on the hardware processing unit 1205 will be presented momentarily.

The storage 1225 may be physical system memory, which may be volatile, non-volatile, or some combination of the two. The term "memory" may also be used herein to refer to non-volatile mass storage such as physical storage media. If the computer system 1200 is distributed, the processing, memory, and/or storage capability may be distributed as well. As used herein, the term "executable module," "executable component," or even "component" can refer to software objects, routines, or methods that may be executed on the computer system 1200. The different components, modules, engines, and services described herein may be implemented as objects or processors that execute on the computer system 1200 (e.g. as separate threads).

The disclosed embodiments may comprise or utilize a special-purpose or general-purpose computer including computer hardware, such as, for example, one or more processors (such the hardware processing unit 1205) and system memory (such as storage 1225), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

The computer system 1200 may also be connected (via a wired or wireless connection) to external sensors 1230 (e.g., one or more remote cameras, accelerometers, gyroscopes, acoustic sensors, magnetometers, etc.). It will be appreciated that the external sensors include sensor systems (e.g., a sensor system including a light emitter and camera), rather than solely individual sensor apparatuses. Further, the computer system 1200 may also be connected through one or more wired or wireless networks 1235 to remote systems(s) 1240 that are configured to perform any of the processing described with regard to computer system 1200.

During use, a user of the computer system 1200 is able to perceive information (e.g., a mixed-reality environment) through a display screen that is included among the I/O interface(s) 1210 and that is visible to the user. The I/O interface(s) 1210 and sensors 1220/1230 also include gesture detection devices, eye trackers, and/or other movement detecting components (e.g., cameras, gyroscopes, accelerometers, magnetometers, acoustic sensors, global positioning systems ("GPS"), etc.) that are able to detect positioning and movement of one or more real-world objects, such as a user's hand, a stylus, and/or any other object(s) that the user may interact with while being immersed in the scene.

The graphics rendering engine 1215 is configured, with the hardware processing unit 1205, to render one or more virtual objects within the scene. As a result, the virtual objects accurately move in response to a movement of the user and/or in response to user input as the user interacts within the virtual scene.

A "network," like the network 1235 shown in FIG. 12, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. The computer system 1200 will include one or more communication channels that are used to communicate with the network 1235. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RANI within a network interface module (e.g., a network interface card or "MC") and then eventually transferred to computer system RANI and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally or alternatively, the functionality described herein can be performed, at least in part, by one or more hardware logic components (e.g., the hardware processing unit 1205). For example, and without limitation, illustrative types of hardware logic components that can be used include Field-Programmable Gate Arrays (FPGAs), Program-Specific or Application-Specific Integrated Circuits (ASICs), Program-Specific Standard Products (ASSPs), System-On-A-Chip Systems (SOCs), Complex Programmable Logic Devices (CPLDs), Central Processing Units (CPUs), and other types of programmable hardware.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for detecting user-object interaction in a mixed-reality environment, the system comprising:
   one or more processors; and
   one or more computer-readable media having stored computer-executable instructions that are operable, when executed by the one or more processors, to cause the system to at least:
   detect a physical controller gesture of a physical controller comprising a physical object in the mixed-reality environment, wherein the physical controller gesture has an associated physical controller orientation identifying a virtual object interaction orientation for the physical controller that is based on a physical geometry of the physical object that constrains a way in which the physical object can be interacted with;
   determine an interaction region for the physical controller gesture;
   identify a plurality of virtual objects within the interaction region, wherein each of the plurality of virtual objects has an associated orientation affinity defining a preferred interaction direction for the virtual object, conformance of the associated physical controller orientation to the associated orientation affinity enabling the physical controller to interact with the virtual object;
   determine an orientation similarity score between the associated physical controller orientation and the associated orientation affinity for each of the plurality of virtual objects within the interaction region;
   in response to determining that at least one orientation similarity score exceeds a predetermined threshold, select a particular virtual object of the plurality of virtual objects that has a greatest orientation similarity score out of all orientation similarity scores determined for each of the plurality of virtual objects; and
   based at least on selecting the particular virtual object, execute an interaction between the physical controller and the particular virtual object.

2. The system of claim 1, wherein each orientation similarity score is based on a dot product of the associated physical controller orientation and the associated orientation affinity for one virtual object of the plurality of virtual objects.

3. The system of claim 1, wherein the computer-executable instructions are further operable to cause the system to:
   determine a directional component of the physical controller gesture; and
   determine a directional preference for at least one of the plurality of virtual objects within the interaction region.

4. The system of claim 3, wherein the interaction between the physical controller and the particular virtual object is executed only upon determining that the directional component of the physical controller gesture complies with the directional preference for at least one of the plurality of virtual objects.

5. The system of claim 3, wherein the directional component of the physical controller gesture is based on a velocity of the physical controller gesture.

6. The system of claim 1, wherein the interaction between the physical controller and the particular virtual object is executed only upon determining that a pose of the physical controller corresponds to an interactive pose.

7. The system of claim 1, wherein the interaction region for the physical controller gesture is determined based on a pose of the physical controller.

8. The system of claim 1, wherein the interaction region for the physical controller gesture is a conical region extending away from the physical controller.

9. The system of claim 1, wherein the particular virtual object comprises an affordance of a hologram in the mixed-reality environment.

10. A method for detecting user-object interaction in a mixed-reality environment, the method comprising:
    detecting a physical controller gesture of a physical controller comprising a physical object in the mixed-reality environment, wherein the physical controller gesture has an associated physical controller orientation identifying a virtual object interaction orientation for the physical controller that is based on a physical geometry of the physical object that constrains a way in which the physical object can be interacted with;
    determining an interaction region for the physical controller gesture;
    identifying one or more virtual objects within the interaction region, wherein each of the one or more virtual objects has an associated orientation affinity defining a preferred interaction direction for the virtual object, conformance of the associated physical controller orientation to the associated orientation affinity enabling the physical controller to interact with the virtual object, at least a particular virtual object of the one or more virtual objects having a plurality of orientation affinities;
    determining a particular orientation affinity of the particular virtual object based on a determined pose of the physical controller gesture, wherein different poses correspond to different orientation affinities;
    determining an orientation similarity score between the associated physical controller orientation and the particular orientation affinity;
    in response to determining that the orientation similarity score for the particular orientation affinity and the associated physical controller orientation exceeds a predetermined threshold, selecting the particular virtual object; and
    based at least on selecting the particular virtual object, execute an interaction between the physical controller and the particular virtual object.

11. The method of claim 10, wherein the orientation similarity score is based on a dot product of the associated physical controller orientation and the associated orientation affinity for the particular virtual object.

12. The method of claim 10, further comprising:
    determining a directional component of the physical controller gesture; and
    determining a directional preference for the particular virtual object.

13. The method of claim 12, wherein the interaction between the physical controller and the particular virtual object is executed only upon determining that the directional component of the physical controller gesture complies with the directional preference for the particular virtual object.

14. The method of claim 12, wherein the directional component of the physical controller gesture is based on a velocity of the physical controller gesture.

15. The method of claim 10, wherein the interaction between the physical controller and the particular virtual object is executed only upon determining that the determined pose of the physical controller corresponds to an interactive pose.

16. The method of claim 10, wherein the interaction region for the physical controller gesture is determined based on the determined pose of the physical controller.

17. The method of claim 10, wherein the interaction region for the physical controller gesture is a conical region extending away from the physical controller.

18. The method of claim 10, wherein the particular virtual object comprises an affordance of a hologram in the mixed-reality environment.

19. One or more hardware storage devices having stored thereon computer-executable instructions, the computer-executable instructions being executable by one or more processors of a computer system to cause the computer system to:
    detect a physical controller gesture of a physical controller comprising a physical object in a mixed-reality environment, wherein the physical controller gesture has an associated physical controller orientation identifying a virtual object interaction orientation for the physical controller that is based on a physical geometry of the physical object that constrains a way in which the physical object can be interacted with;
    determine an interaction region for the physical controller gesture;
    identify one or more virtual objects within the interaction region, wherein each of the one or more virtual objects has an associated orientation affinity defining a preferred interaction direction for the virtual object, conformance of the associated physical controller orientation to the associated orientation affinity enabling the physical controller to interact with the virtual object;
    determine an orientation similarity score between the associated physical controller orientation and the associated orientation affinity for each of the one or more virtual objects within the interaction region;
    determining that the orientation similarity score between the associated physical controller orientation and a particular virtual object of the one or more virtual objects exceeds a predetermined threshold;
    determine a directional preference of the particular virtual object, independent of the associated orientation affinity;
    determine a directional component of the physical controller gesture, comprising a movement direction of the physical controller gesture;
    determine that the directional preference of the particular virtual object matches the directional component for the physical controller gesture;
    in response to determining that both (1) the orientation similarity score between the associated physical controller orientation and the particular virtual object exceeds the predetermined threshold and that (2) the directional preference of the particular virtual object matches the directional component for the physical controller gesture, select the particular virtual object; and
    based at least on selecting the particular virtual object, execute an interaction between the physical controller and the particular virtual object.

20. The one or more hardware storage devices of claim 19, wherein the orientation similarity score is based on a dot product of the associated physical controller orientation and the associated orientation affinity for the particular virtual object.

21. The system of claim 1, wherein the interaction region has a variable size that varies according to different gesture poses of the physical controller.

22. The system of claim 1, wherein the interaction region is presented as a hologram with a predefined level of transparency and includes a defined outline for interaction region boundaries.

* * * * *